Figures 1, 2:
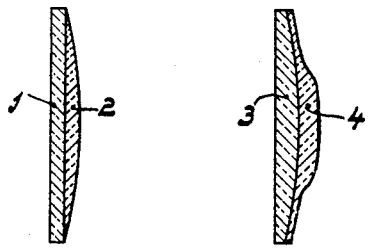

Oct. 26, 1943.      H. RINIA      2,332,930
OPTICAL ELEMENT
Filed Jan. 15, 1941

INVENTOR
H. Rinia

Patented Oct. 26, 1943

2,332,930

UNITED STATES PATENT OFFICE 2,332,930

OPTICAL ELEMENT

Herre Rinia, Eindhoven, Netherlands; vested in the Alien Property Custodian

Application January 15, 1941, Serial No. 374,598
In the Netherlands October 21, 1939

4 Claims. (Cl. 88—57)

It has been suggested to make lenses, particularly spectacle-glasses, of polysterol. It has, however, been found that, although the use of this material and also of other materials which are capable of being moulded or of being treated in a similar manner for constituting lenses offers advantages in view of the low cost of manufacture, lenses made of materials of this type are comparatively inaccurate and in addition lack the required rigidity. According to the invention, it has now been found that the latter drawback can be removed by comparatively simple expedients and the use of these expedients also makes it possible to meet the first-mentioned difficulty.

The optical element according to the invention, such as a lens, is constituted by an inorganic layer such as a glass layer and by one or more layers of a transparent material which at least in its initial state is capable of being deformed at a low temperature. The material may be in a dissolved state, and preferably consists of a material capable of being gelatinised, moulded, die-cast, extruded, so as to provide a structure in which the adjacent surfaces of the said layers are fixed to each other. The inorganic layer of glass whose composition may be chosen according to circumstances serves in the optical element according to the invention as a support for the layers of the material which is capable of being deformed at low temperature so that the optical element according to the invention mainly derives its mechanical strength from the inorganic layer.

According to favourable forms of construction of the optical element according to the invention use may be made of numerous inorganic or organic substances as materials for the layer capable of being deformed at low temperature (that is to say a temperature of 300° C. or lower). Thus, for example, use may be made of certain artificial materials, certain synthetic resins and certain natural resins. As examples of artificial substances we may mention, for example, certain benzyl-cellulose mouldable materials, phenoplastics, aminoplastics and similar materials. In addition use may be made of a nitrocellulose mouldable material in which nitrocellulose serves as a solvent for certain substances so that the product known under the trade name "Trolyt F" is obtained and in addition some synthetic forms of lacquer may be employed as the artificial material.

As synthetic resins we may mention inter alia polymerised vinyl compounds such as polysterol, mixed polymers, certain castable resins, for example castable phenol resins, metacryl acid esters or the like. In addition, transparent artificial rubber may be used successfully. As natural resins natural rubber (latex), japans, copal and dammar lacquers may be used inter alia. Depending on the nature of the material that part of the optical element according to the invention which is made of this material may be shaped into the desired form by moulding, die-casting, extrusion, or a similar process. Some of these materials are thermo-plastic and an element-part made of such material, after being shaped into its final form, can be rendered plastic again by heating. Accordingly both the material of the element-part and its starting material are capable of being deformed at a low temperature. In the case of other materials, for example with certain synthetic resins, a physical and/or chemical change of the material occurs that the element-part concerned is no longer capable of being deformed at a low temperature however, since the starting material is deformable at a low temperature such materials are satisfactory for the purposes of the invention.

According to a further favourable form of construction of the element according to the invention the element-part applied to the inorganic layer is made of a substance capable of being gelantised in the dissolved state. The expression "gelatinisable substances" is to be intended to refer in this connection to those substances which are capable of being colloidally distributed in the dissolved state and of being separated from this solution to form a gel. The term "gel" is intended to refer to a solid substance possessed of rigidity accompanied by resilience.

Substances suitable for the object sought and capable of being gelatinised in the dissolved state may contain organic constituents such as gelatine, agar-agar and pectine. It is also possible for these substances to contain inorganic components such as silicates or alumina, either jointly with or without glycerine, in order to assist the optical homogeneity of the element-part concerned. Depending on the substance the solvent is chosen so as to obtain a gelatinisable solution. Water, for example, is chosen as a solvent of gelatine.

If desired the element-part concerned may be hardened during or subsequent during desiccation, for example, by means of formaline.

The use of such a gelatinisable substance offers the advantage that due to the contraction that occurs during the desiccation of the gel of the templet into which the gelatinisable solution is introduced may have substantially larger dimensions than the element-part which is manufactured with the aid of the said templet. This contraction may have a value which is comprised between factors of the order of magnitude of 3 and of the order of magnitude of 50. By imparting a given value to the concentration of the gelatinisable substance it is possible accurately to predetermine how much the contraction will be in a given case. If, for example, the contraction factor is chosen to be 8 an element-part of a gelatinisable substance having differences in thickness of 0.3 mm. can be made in a templet in which the differences in level which must produce the said differences in thickness may be 2.4 mm. The templet can therefore be made very accurately on an enlarged scale with respect to the product and this introduces an advantage.

It has been stated above that the optical element according to the invention mainly derives its mechanical strength from the inorganic layer that exists in this element. Owing to this the layers, of which at least the initial material is capable of being deformed at a low temperature, can be constructed so as to be very thin in a favourable form of construction of the optical element according to the invention so that in this form of construction the latter may have a thickness less than $\frac{1}{30}$ of its largest diameter at its thinnest points. This offers the advantage that the element-part made of this material can be constructed so as to be very thin so that there is no risk that large differences in thickness in the element-part may lead to inhomogeneities during manufacture.

The optical element according to the invention lends itself particularly to use in optical systems the quality of which plays a decisive part as, for example, in the case of opera glasses, cameras, projectors, spectographs, microscopes and similar instruments. Such is particularly the case when the differences in thickness in the direction of the optical axis in an element-part made of a material or/and initial material capable of being deformed at a low temperature are small, for example smaller than 2 mm. The great accuracy which occurs with these low differences in thickness may be due to the fact, that practically no inhomogeneities occur in the material during the manufacture of the element-part.

The optical element according to the invention offers particular advantages when it must be made with one or two non-spherical refracting surfaces. The manufacture of such non-spherical surfaces in glass is comparatively costly since such surfaces are practically always ground by hand. This disadvantage can be obviated by constructing the optical element concerned in the manner above indicated. In this case the non-spherical refracting surface may be made as a thin layer by moulding the material capable of being deformed at a low temperature or by similar treatment or else by gelatinising and drying, if desired hardening, from a solution. In this case such a thin layer may be applied to a plane or spherical inorganic plate, for example a glass plate. This inorganic layer or plate can therefore be shaped into the desired form by mechanical grinding and an aspherical refracting surface can be provided thereon in accordance with the invention thereby obviating the need for involved manual grinding.

Naturally, such layers may be secured to both sides of a glass plate or lens.

In a further form of construction of the optical element according to the invention the inorganic layer is constructed so as to be plano-parallel. This construction offers particular advantages when the layer of which at least the initial material is deformable at a low temperature is very thin, the inorganic layer serving in this case almost entirely as a means for supporting.

According to the invention it has been found that the optical element according to the invention offers particular advantages in an optical system of the kind, for example, of that of Schmidt which is described in the "Zentralzeitung für Mechanik und Optik," 52nd volume, 1932, number 2, in which an element for correcting the spherical aberration occurring is provided in the system. In this kind of system it is known to give the desired correcting action to an originally plane glass plate by grinding of the surface. Such a grinding process is, however, exceedingly costly since the differences in thickness occurring in that surface of the glass plate which serves for correction are very small and generally only of the order of magnitude of a few tenths of a millimeter. Since in such a case the correction-element serves to exercise a correcting action it will exhibit practically no optical strength in the paraxial region. By proceeding in accordance with the invention the glass plate concerned can be constructed so as to be planoparallel and has, for example, secured to it a correction-element moulded in a die or formed in a templet from a gelatinisable substance. In this case the die may be used for the manufacture of any number of correction-elements.

According to the invention, it is preferable that in such an optical system that the side of the correction-element which is remote from the inorganic layer to which this element is secured should be protected by a further system element, which may be for example a lens, a mirror, a glass plate or the like. In an objective such a correction-element may be applied, for example, to one of the objective-flanges and in such manner that the said element is protected from without against contact or damage by the lens to which it is applied and/or by the other lenses.

The optical element according to the invention is preferably made in such manner that the inorganic layer serves as a substratum and has applied to it the transparent layer the initial material of which at least is deformable at a low temperature by means of a die by moulding, diecasting, extrusion or a similar process. In some cases the transparent layer will adhere to the substratum spontaneously and in other cases a suitable adhesive is used for the attachment of the layers to one another.

If, according to the invention, the substance of which at least the initial material, is deformable at a low temperature is constituted by a gelatinisable substance a templet of suitable dimensions is preferably mounted above the inorganic layer serving as a substratum and the gelatinisable substance which is in the dissolved state is introduced therein. Once the gelatinisable substance is gelatinised and desiccated there is on the inorganic substratum a layer of the desired dimensions constituted by the gelatinised substance which, due to the shape of the templet and the degree of contraction, manifests the desired shape. Since this layer adheres to the substratum during its formation the contracting effect described is only obtained in the direction of the optical axis of the element.

In order that the invention may be clearly understood and readily carried into effect it will now be described more fully with reference to the accompanying drawing.

Fig. 1 shows a form of construction of the optical element according to the invention in which a plano-parallel glass plate 1 has a thin layer of latex 2 secured to it. This latter layer is constructed to be spherical on its side remote from the glass plate. The figure shows that this latex layer is very thin and by itself would be without the required rigidity. This defect is removed by the presence of the glass layer 1 which gives the necessary mechanical strength to the optical element shown.

Fig. 2 shows a further form of construction in which the glass plate 3 constructed to be spherical on one side has applied to it a transparent layer 4 moulded from a benzyl cellulose material. The latter, which serves to exercise a correction on the action of the lens 3, has, on its side remote from the glass, a non-spherical rotation-symmetrical surface which can be moulded from the benzyl cellulose material in a suitable manner. The construction shown avoids the need for the glass surface itself to be given by grinding the form illustrated which from a grinding-technical viewpoint is rather involved.

Figure 3:
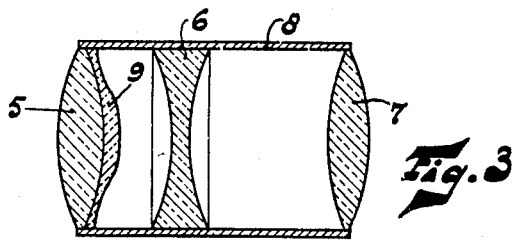

Fig. 3 shows an objective constituted by three lenses 5, 6 and 7 mounted in a metal sleeve 8. The lens 5 has secured to it a correction-element 9 made of polysterol. Due to the presence of the lenses 5, 6 and 7 and of the sleeve 8 the element 9 is precluded from being damaged or contacted under normal conditions. For the sake of clearness the dimensions of the element 9 in the direction of the optical axis of the objective are shown enlarged.

Figure 4:
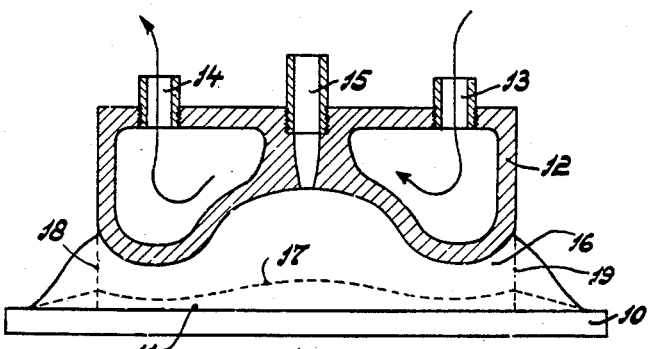
Figure 5:
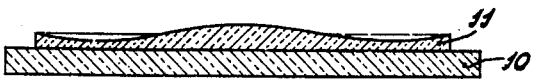

Figs. 4 and 5 show a form of construction of the optical element according to the invention in which a glass layer 10 which is constructed to be plano-parallel has applied to it a non-spherical rotation-symmetrical body 11 made of a substance capable of being gelatinised in the dissolved state. The glass layer 10 serves as a carrier for the correction-element 11 suitable for example, in the optical system according to Schmidt. Such an element may be made in the manner shown in Fig. 4, the glass layer 10 serving as a substratum and being surmounted by a templet 12 which is constructed so as to be internally hollow. The internal space in the templet is provided with two pipes 13 and 14 for the supply and discharge of water by which the templet is maintained at the desired temperature. In addition, the templet has formed in it a central bore 15 which serves as a supply pipe for the material 16 of which the body 11 is to be made. This may consist, for example, of water in which gelatine is dissolved in a given concentration corresponding to the desired contraction. By means of the water which flows through it, the templet 12 is maintained at a temperature at which the gelatine just remains in the dissolved state. By gradually reducing the temperature of the templet (if required also of the glass plate) the solution 16 is gelatinised and a gel is produced which is possessed of resilience accompanied by rigidity. The templet 12 can then be removed and the gelatinised material 16 remains on the plate 11. When this material is dried it contracts in a vertical direction so that the upper surface of the material 11 which by now is of pure gelatine is given the form indicated by the dotted line 17. At the same time this material has adhered to the plate 11 so that practically no contraction occurs in a horizontal direction. Finally, the edge of the gelatine material is severed along the lines 18 and 19 and the gelatine may be hardened, if desired for example with the aid of formaline. Thus the optical element shown in Fig. 5 is obtained and may be used successfully as a correction-element in the above-mentioned optical system of Schmidt.

What I claim is:

1. A light-transmitting lens system having light-refracting surfaces, comprising a mechanically-rigid lens of a transparent inorganic material, and a second lens having a surface forming one of the exposed surfaces of the system and being of a light-transparent organic material which is readily moldable at a temperature lying between the normal temperature of the lens system and about 300° C., said second lens being molded upon the surface of said first lens and being secured thereto.

2. A light-transmitting lens system having light-refracting surfaces, comprising a mechanically-rigid lens having a spherical surface and consisting of a light-transparent inorganic material, and a second lens having a non-spherical rotation-symmetrical surface forming one of the exposed surfaces of the system and being of a light transparent organic material which is readily moldable at a temperature lying between the normal temperature of the lens system and about 300° C., said second lens being molded upon the surface of said first lens and being secured thereto.

3. A light-transmitting lens system having light-refracting surfaces, comprising a mechanically-rigid lens of a light-transparent inorganic material, and a second lens having a surface forming one of the exposed surfaces of the system and being of a light-transparent resin which is readily moldable at a temperature lying between the normal temperature of the lens system and about 300° C., said second lens being molded on said first lens and being secured thereto.

4. A light-transmitting lens system having light-refracting surfaces, comprising a mechanically-rigid lens of a light-transparent inorganic material, and a second lens having a surface forming one of the exposed surfaces of the system and being of a light-transparent gelatinisable material in a hardened state, said second lens being molded upon the surface of said first lens and being secured thereto.

HERRE RINIA.